March 23, 1954 — I. J. SUTHERLAND — 2,673,092
DEVICE FOR A TRACTOR-TRAILER COMBINATION FOR
INCREASING TRACTOR REAR WHEEL ADHESION
Filed Feb. 20, 1952 — 2 Sheets-Sheet 1
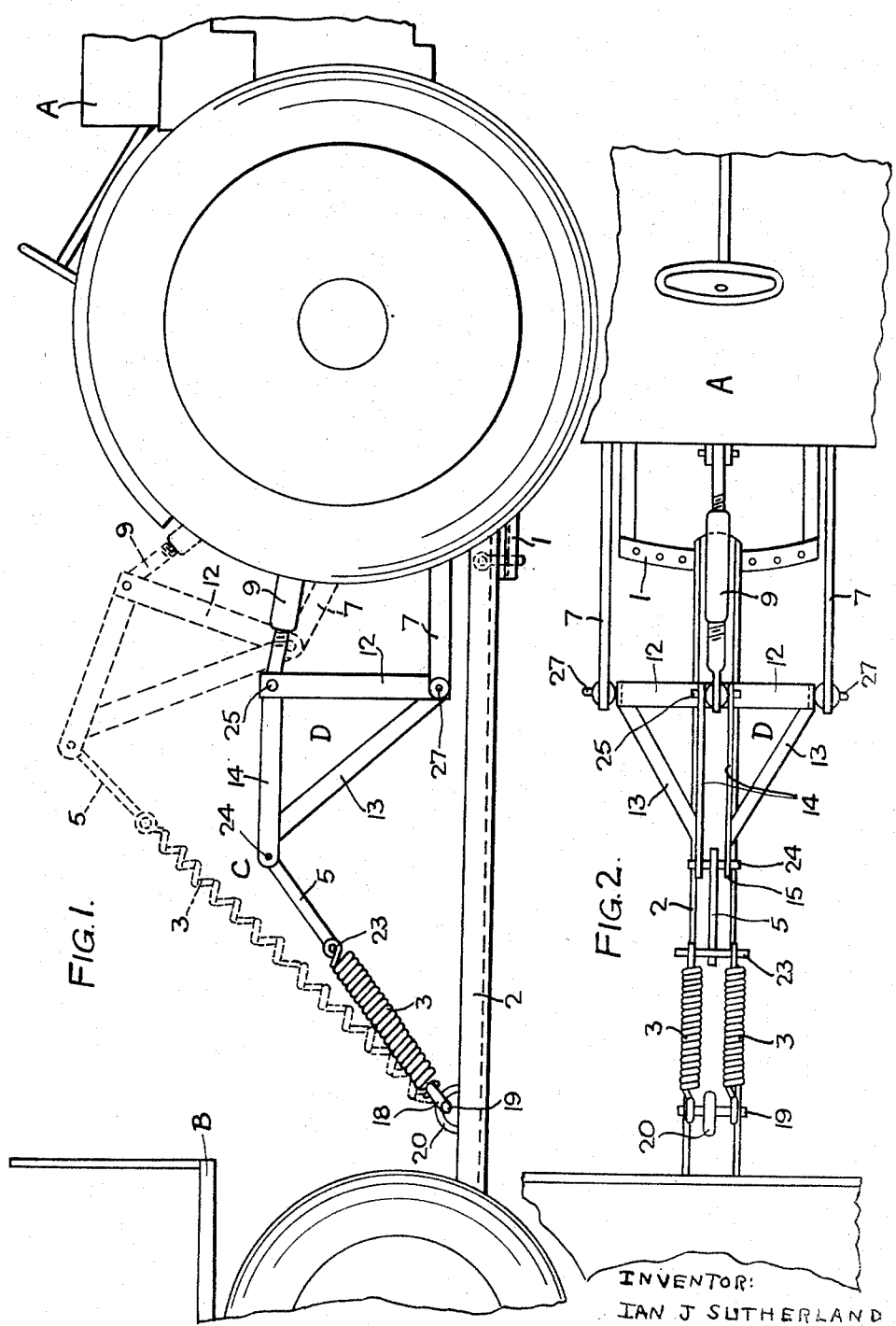
INVENTOR:
IAN J SUTHERLAND
BY: Francis E. Bryce
ATTORNEY

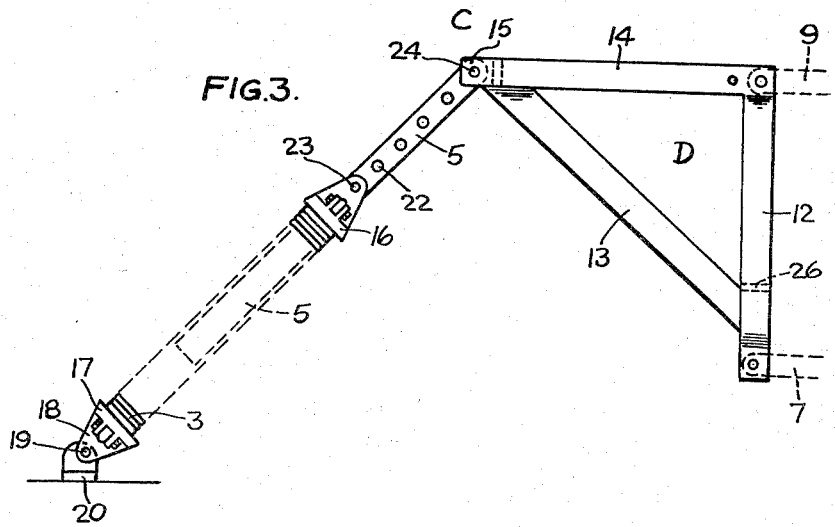
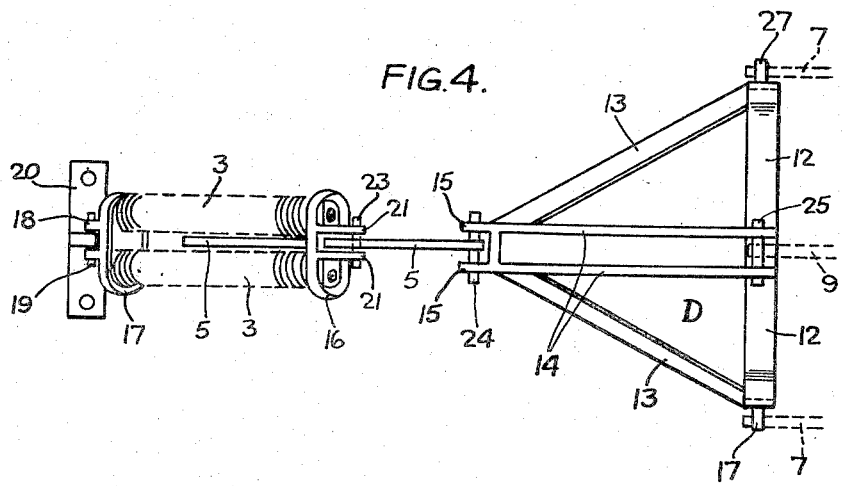

Patented Mar. 23, 1954

2,673,092

UNITED STATES PATENT OFFICE 2,673,092

DEVICE FOR A TRACTOR-TRAILER COMBINATION FOR INCREASING TRACTOR REAR WHEEL ADHESION

Ian James Sutherland, Lauder, Scotland

Application February 20, 1952, Serial No. 272,561

5 Claims. (Cl. 280—406)

This invention relates to a device for increasing the rear wheel adhesion of a tractor when attached to a trailer, which may be a vehicle or an agricultural implement or any trailed implement, the object of the present invention being to reduce the tendency of the tractor rear wheels to slip on greasy, soft or slippery ground.

It is known to reduce such slip by adding weight to the rear end of the tractor, such as by attaching disc weights to the rear wheels. It is also known to fit the rear wheels with slip-reducing chains, strakes or other ground-engaging devices.

The tractor is usually connected to the trailer by means of a draw bar articulated at the forward end to one of the frame members of the tractor and attached or articulated at its rear end to a frame member of the trailer. Usually the draw bar is detachable from both the tractor and the trailer, and it is a further object of the present invention to provide a device for use in conjunction with the draw bar whereby the weight of the trailer acting through my device is utilized to exert a bearing-down load on the rear of the tractor.

It is a still further object of my invention to enable the device to be used with advantage with tractors of the kind provided with power lifting mechanism for raising and lowering a trailed implement.

According to my invention I provide in a tractor-trailer combination having a draw bar between the tractor and the trailer, means for increasing the tractor rear wheel adhesion by transmitting part of the weight of the trailer to the rear of the tractor comprising a device interconnecting a point at the front of the trailer to the rear of the tractor, resilient means by which said device is maintained in a resiliently stressed condition between the trailer and tractor, and means for adjusting the resiliency of said resilient means to produce a bearing down load on the tractor rear wheels such that they will effectively grip the ground under varying ground conditions.

The device may conveniently consist of an extensible member incorporating resilient means for tensioning the member between a point of connection with the lower part of the trailer and a point of connection with an upper rear part of the tractor. For example, the extensible member may be an elastic tensioning device incorporating a spring or springs and increased tension in said member may be produced by providing on the tractor manually or power-actuated adjusting means for extending said member and increasing the tension exerted thereon by the spring or springs or other resilient means. The adjusting means may be operated by the power lift mechanism of the tractor, where the latter is fitted with a power lift for a trailed implement.

The invention will be more readily understood by reference to the accompanying drawings illustrating, by way of example, a preferred construction of my improved device:

Fig. 1 is a side view and Fig. 2 a plan view illustrating the device applied to a tractor-trailer combination in which the tractor is provided with a known form of three-point power lift linkage system.

Figs. 3 and 4 are side and plan views respectively of the device by itself.

In the construction illustrated, the device comprises a pair of helical springs 3 arranged side by side, the springs being connected together at their ends by upper and lower connecting members 16 and 17 respectively. The lower member 17 has lugs 18 for attachment by means of a cross pin or bolt 19 to the eye of a lug plate 20 adapted to be secured to the rear part of a draw bar 2 which connects a member 1 of a tractor A to a trailer B in known manner. The trailer B may be a vehicle on wheels or any agricultural or other trailed implement, which may or may not be supported on wheels. Instead of securing the lug plate 20 to the draw bar, it may be secured to a frame member of the trailed vehicle or implement. The member 16 connecting the upper ends of the springs is provided with lugs 21 and is slotted for the passage between the lugs of a bar or link 5 which has one of more apertures 22 therethrough. A pin 23 passed through the lugs 21 and any one of the apertures 22 enables the projecting length of the link 5 to be varied. The upper end of the link 5 is connected by a cross pin 24 to spaced lugs 15 at the apex C or rear upper corner of a substantially triangulated structure denoted by the general reference character D. The structure D shown is composed of lateral spaced bars 12 which converge upwards towards and are welded or otherwise secured to the front ends of a pair of connected horizontal bars 14 apertured at their front ends for the passage therethrough of a cross pin 25. Rearwardly and upwardly extending bars 13 extend from the lower ends of the bars 12 to the rear ends of the horizontal bars 14, being secured by welding or otherwise to brace the structure D, which may be further braced, if desired, by a horizontal bracing member 26 between the convergent bars 12. Pins 27 extending laterally outwards from the lower ends of the bars 12 enable the structure D to be pivotally engaged at its lower corners with the rear ends of links 7 or other members extending rearwards from the tractor. The pin 25 enables the front upper corner of the structure D to be pivotally attached to the rear end of an adjustable member 9 which may be a link pivotally attached at its front end to the tractor. The member 9 may be of fixed length or, as indicated in Figs. 1 and 2, it may be composed of sections in screw-threaded connection or otherwise made of adjustable length.

The lower pair of links 7 and the upper member 9 may constitute the three links of the well-known three-point linkage system commonly provided with power lift mechanism on a tractor for lifting and lowering a trailed implement when the latter is directly attached to the links 7 and 9 as is normal practice. The links 7 may, however, be any fixed or pivoted members projecting from the tractor and the link 9 may be any member extending from the tractor and capable of being raised by manually or power-actuated mechanism to cause the rear apex C of the structure D to move upwards and increase the tension of the springs 3.

The device operates as follows:

The pin 23 connecting the springs to the link 5 is passed through one or other of the apertures 22 according to the desired tension on the springs 3 and/or the link 9 is adjusted to give the desired tension such that the weight of the trailer B acting through the springs 3 will exert a downward force at the apex C of the structure D and thence through the link 9 to the tractor, this force serving to hold down the rear end of the tractor and tending to increase the adhesive grip of the tractor wheels on the ground. Any rising movement of the rear of the tractor will cause the link 9 to move upwards, thus increasing the tension in the springs 3, which will be extended and increase the power exerted by the device to hold down the rear end of the tractor and reduce or eliminate any tendency of the tractor rear wheels to slip. On slippery ground, the tensional force of the springs 3 can be increased by raising the link 9 by manual or power-actuated adjusting means. Owing to the elasticity of the springs 3, the latter, when extended, will control any lifting movement of the rear of the tractor, care being taken of course to ensure that the pull exerted by the springs 3 on the link 9 is not so great as to lift the front wheels of the tractor off the ground by tilting the tractor about its rear axle.

My improved device is positioned centrally in the longitudinal direction of the tractor-trailer combination so that it does not interfere with the normal steering motion of the tractor-trailer combination.

Although I have illustrated springs, any other suitable adjustable elastic tensioning device may be employed. The link 5 may be omitted by directly connecting the upper ends of the springs 3 to the structure D by means of the pin 24. The springs 3 may be encased to protect them from the weather and to prevent injury to persons.

It will be understood that the tensioning unit including the springs 3 and the triangular structure D may be supplied as a separate assembly for attaching to any tractor-trailer combination.

The structure D may be of any suitable construction providing pivotal connection at its lower end to the links or other members 7 and provided with upper front and rear connections for attachment to the link 9 and the springs 3 respectively.

I claim:

1. A tractor-trailer combination including a draw bar between the tractor and trailer, an extensible member connected between a point of connection at the lower part of the trailer and a point of connection at the upper part of the tractor, spring means incorporated in said member and holding it in tension between the tractor and trailer to hold the rear of the tractor on the ground, and adjusting means on the tractor for extending said member to increase the load exerted thereby on the tractor to hold it on the ground.

2. A tractor-trailer combination including a draw bar connecting the tractor and trailer, an adjustable member extending rearwards from said tractor, a pair of lower members laterally spaced apart and extending rearwards from the tractor at a point below said adjustable member, a plurality of parallel springs connected together at their ends, means connecting one end of said springs to the draw bar, a triangulated structure, a connection between a rear upper part of said structure and the other end of said springs, a connection between a front upper part of said structure and said adjustable member, and means pivotally connecting the lower part of said structure to said pair of spaced lower members.

3. In a tractor-trailer combination having a draw bar connection and a three-point power lift linkage controlled by a power lift mechanism on the tractor, a hitch for increasing the tractor rear wheel adhesion comprising a support structure having three-point attachment to said power lift linkage, and a spring member between the draw bar and said structure, said spring member inclining upwards to said structure and acting to exert a downward pull on said structure when the latter is lifted by the power lift linkage.

4. For a tractor-trailer combination having a draw bar between the tractor and trailer, a hitch for applying an additional load to the rear of the tractor through a three-point power lift linkage system controlled by power-lift mechanism on the tractor, said hitch comprising a rigid triangulated structure presenting spaced front and rear coupling elements, a longitudinal member connecting said elements, a pair of laterally spaced lower pivotal coupling elements beneath said front coupling element, and members connecting said lower pivotal coupling elements to said front and rear coupling elements, said front coupling element and lower pivotal coupling elements being adapted for connection to the three-point linkage system of the tractor, a spring member articulated at one end to said rear coupling element and attached at the other end to a point at the front of the tractor, raising of said power lift linkage system causing said rear coupling element to rise and to extend said spring member, the increased tension in said spring member being transmitted through said rigid triangulated structure to the power lift linkage system as a force acting to hold the rear of the tractor down on the ground.

5. In a tractor-trailer combination, a draw bar between the tractor and trailer, and means for applying an additional load to the tractor rear wheels to reduce slip comprising a hitch incorporating a spring member and spring adjusting means under the control of the tractor driver and by the operation of which part of the load of the trailer can be transmitted through the spring member to the rear wheels of the tractor.

IAN JAMES SUTHERLAND.

References Cited in the file of this patent

UNITED STATES PATENTS

| Number | Name | Date |
|---|---|---|
| 1,481,376 | Klein | Jan. 22, 1924 |
| 2,336,410 | McKay | Dec. 7, 1943 |
| 2,398,365 | Ellis | Apr. 16, 1946 |
| 2,469,605 | McKay | May 10, 1949 |